United States Patent
Tachibana (10) Patent No.: US 9,113,016 B2
(45) Date of Patent: Aug. 18, 2015

(54) IMAGE FORMING APPARATUS, OPERATION SUPPORTING METHOD FOR IMAGE FORMING APPARATUS, AND STORAGE MEDIUM FOR FIXING A FAILURE RELATING TO IMAGE FORMATION

(71) Applicant: CANON KABUSHIKI KAISHA, Tokyo (JP)

(72) Inventor: Yoshiro Tachibana, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/463,426

(22) Filed: Aug. 19, 2014

(65) Prior Publication Data
US 2015/0055166 A1 Feb. 26, 2015

(30) Foreign Application Priority Data
Aug. 21, 2013 (JP) .................. 2013-171539

(51) Int. Cl.
G06K 15/00 (2006.01)
H04N 1/00 (2006.01)
H04N 7/18 (2006.01)
G06F 3/12 (2006.01)
H04N 21/488 (2011.01)
G03G 15/00 (2006.01)

(52) U.S. Cl.
CPC .......... *H04N 1/00477* (2013.01); *G06F 3/1229* (2013.01); *H04N 1/00029* (2013.01); *H04N 1/00408* (2013.01); *H04N 7/183* (2013.01); *G03G 15/70* (2013.01); *G06F 3/121* (2013.01); *H04N 1/00424* (2013.01); *H04N 21/4882* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,750,878 B1 * | 6/2004 | Tatsuo et al. | 715/705 |
| 7,403,721 B2 * | 7/2008 | Yamada | 399/21 |
| 8,010,009 B2 * | 8/2011 | Mochizuki et al. | 399/81 |
| 2012/0287457 A1 * | 11/2012 | Ishii | 358/1.14 |

FOREIGN PATENT DOCUMENTS

| | | |
|---|---|---|
| JP | 8-69223 A | 3/1996 |
| JP | 2008-120534 A | 5/2008 |

* cited by examiner

*Primary Examiner* — Miya J Cato
(74) *Attorney, Agent, or Firm* — Canon USA Inc. IP Division (57) ABSTRACT

There is provided an image forming apparatus capable of providing effective guidance on operation procedures for fixing a failure such as a paper jam when the failure occurs. The image forming apparatus displays operation contents for fixing the jam and operations to be performed to resume the stopped job are displayed on a simple maintenance screen. When the jam is fixed according to the operations of the contents, the screen is switched to a reread standby screen. In a case where detailed guidance is necessary, the screen is switched to a detailed maintenance screen.

7 Claims, 7 Drawing Sheets

IMAGE FORMING APPARATUS, OPERATION SUPPORTING METHOD FOR IMAGE FORMING APPARATUS, AND STORAGE MEDIUM FOR FIXING A FAILURE RELATING TO IMAGE FORMATION

BACKGROUND OF THE INVENTION

1. Field of the Invention

The present invention relates to an image forming apparatus having a function for providing effective guidance on operation procedures for fixing a failure when the failure relating to image formation such as paper jam occurs.

2. Description of the Related Art

Image forming apparatuses that provide guidance on operation procedures for fixing a failure to users when a failure such as a paper jam occurs on a conveyance path by displaying the area where the failure has occurred and troubleshooting procedures on a display screen of an operation panel have been known, as discussed, for example, in Japanese Patent Application Laid-Open No. 8-69223.

In recent years, reduction in costs of image forming apparatuses has also been made. For example, an image forming apparatus having a sensor for detecting open or close of a cover of a document conveying device provided in the image forming apparatus, in which the sensor also serves as another sensor to simplify the structure and thereby reducing the costs, has been proposed as discussed, for example, in Japanese Patent Application Laid-Open No. 2008-120534. Generally, only a minimum number of sensors is provided in the low-cost image forming apparatuses. Consequently, for example, with respect to a failure such as the paper jam, the apparatuses often are structured so that the jammed recording sheet can be easily found without using the sensors.

The image forming apparatus discussed in Japanese Patent Application Laid-Open No. 8-69223 displays moving images showing a series of operation procedures to fix a paper jam at each operation of a forward key on an operation panel. Consequently, until the user checks the last operation procedure, the paper jam is not fixed. Also in the image forming apparatus discussed in Japanese Patent Application Laid-Open No. 2008-120534, the number of the remaining operation procedures for fixing the paper jam and the guidance for instructing the next operation are displayed. Consequently, the user is required to check the operation procedures to the last operation procedure.

In image forming apparatuses having simple structures achieving low costs, without using sensors, the cause of the failure can be often easily found. Accordingly, if a technique as discussed in Japanese Patent Application Laid-Open No. 8-96223 is applied to those image forming apparatuses, the user may not maintain the motivation to check the plurality of operation procedures displayed on the operation panel to the last operation procedure. This may cause stress to the user. Especially, in an image forming apparatus employing a method in which fixing of a paper jam is checked by resetting a document on a document conveying device, until the display of resetting the document displayed as the last operation procedure is displayed, the user cannot know that the user has reached the last operation procedure. In such a case, the user may not fix the paper jam.

Such a problem may widely occur in failure relating to image formation other than the paper jam.

The present invention has been made to provide, without causing stress to users, a operation supporting technique for an image forming apparatus for providing effective guidance on operation procedures to fix a failure when the failure relating to image formation occurs.

SUMMARY OF THE INVENTION

The present invention is directed to a operations supporting technique for an image forming apparatus capable of providing effective guidance on operation procedures to fix a failure when the failure relating to image formation occurs without causing stress to users.

According to an aspect of the present invention, an image forming apparatus includes a detection unit configured to detect an occurrence of a failure and the occurrence area of the failure in the image forming apparatus, a first display control unit configured to switch maintenance screens to be displayed indicating a plurality of operation procedures necessary to fix the failure, a second display control unit configured to display maintenance screens indicating the operation procedures necessary to fix the failure, which include the maintenance screens of the number smaller than the number of the screens to be displayed by the first display control unit, and a control unit configured to perform control to enable selective execution of the display by the first display control unit and the display by the second display control unit depending on the area of the occurrence of the failure detected by the detection unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Hereinafter, an exemplary embodiment of the present invention will be described with reference to the attached drawings.

<Structure of Image Forming Apparatus>

Figure 1:
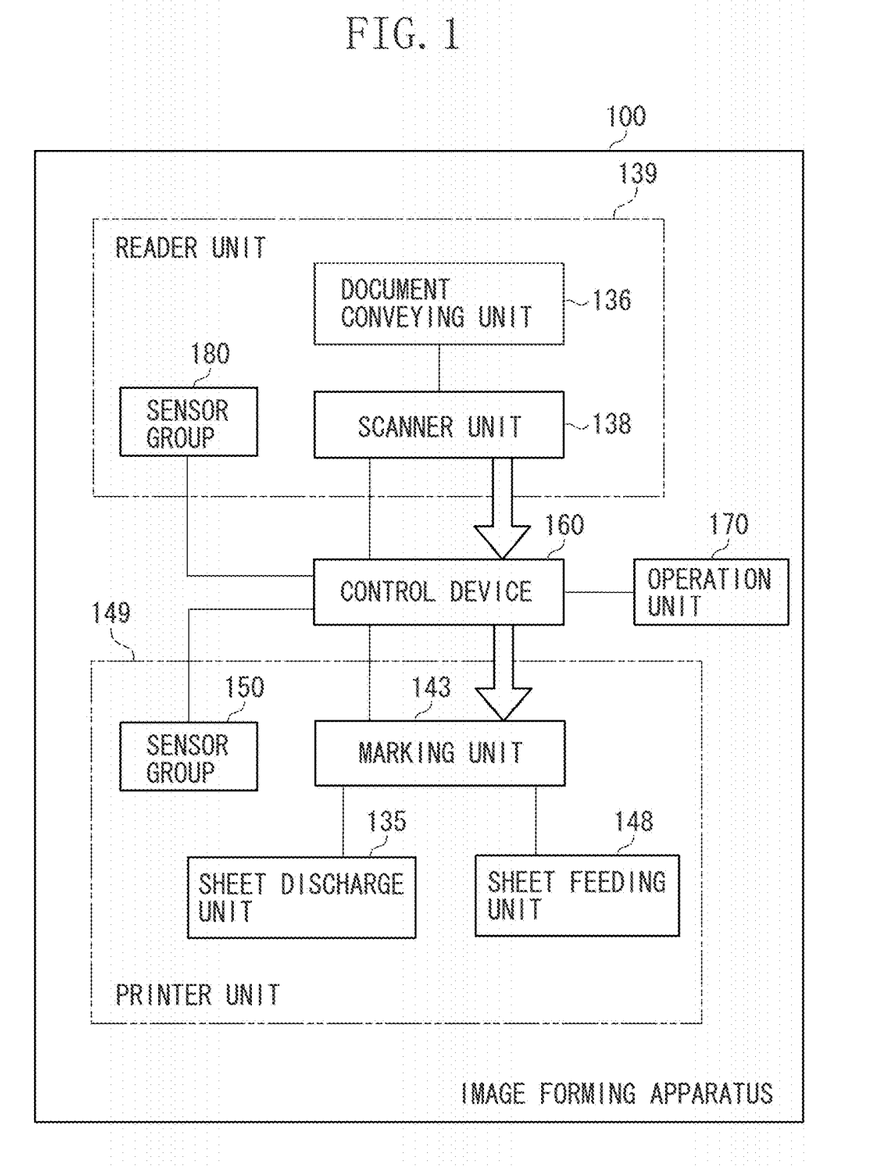
FIG. 1 is a block diagram illustrating an example of a structure of an image forming apparatus according to an exemplary embodiment.

FIG. 1 is a block diagram illustrating an example of a structure of an information processing apparatus according to an exemplary embodiment of the present invention. An image forming apparatus 100 includes a reader unit 139, a printer unit 149, a control device 160, and an operation unit 170.

The reader unit 139 includes a document conveying unit 136, a scanner unit 138, and a sensor group 180. The document conveying unit 136 conveys a document to be read. The scanner unit 138 reads the document conveyed from the document conveying unit 136. The image data read by the scanner unit 138 is input to the control device 160.

The sensor group 180 includes a plurality of sensors provided to some appropriate areas on the document conveyance path of the reader unit 139. The sensor group 180 detects changes in state on the conveyance path. For example, the sensor group 180 detects whether there is a document on the conveyance path, whether a paper jam has occurred, and where the paper jam has occurred. The detection result is used to control the document conveyance timing by the control device 160. The detection result is also used to notify the control device 160 of the occurrence of the paper jam and the area of the occurrence.

The printer unit 149 includes a sheet feeding unit 148, a marking unit 143, a sheet discharge unit 135, and a sensor group 150. The sheet feeding unit 148 has a plurality of cassettes each storing different size recording sheets, and feeds the recording sheets from each cassette. The marking unit 143 executes an electrophotographic image forming process. The marking unit 143 performs image formation on the recording sheet fed from the sheet feeding unit 148 based on the image data input from the scanner unit 138 via the control device 160. The discharge unit 135 performs processing such as sorting and stapling on the recording sheet subjected to the image-forming process by the marking unit 143, and discharges the sheet to the outside of the apparatus.

The sensor group 150 includes a plurality of sensors provided to some appropriate areas on the conveyance path of the recording sheet in the printer unit 149. The sensor group 150 detects changes in state on the conveyance path. For example, the sensor group 150 detects whether there is a recording sheet to be printed, or a printed recording sheet on the conveyance path, whether a paper jam has occurred, and where the paper jam has occurred. The detection result is used to control the timing for conveying the recording sheet by the control device 160. The detection result is also used to notify the control device 160 of the occurrence of the jam and the area of the occurrence.

The control device 160 controls the operation of the reader unit 139, the printer unit 149, and the operation unit 170. Specifically, the control device 160 reads image data of a document with the reader unit 139, and outputs the image data to the printer unit 149 to form an image on a recording sheet. This implements a copy function. The control device 160 also implements a guidance function for providing guidance on operation procedures containing operation contents to users based on guidance information stored in advance and detection results of the sensor groups 150 and 180 that are sequentially input.

The operation unit 170 is an example of a display device, and includes, for example, an operation panel of a touch screen. On the display screen of the touch screen, various keys for receiving instructions input by users to the control device 160 are displayed. On the display screen, a maintenance screen showing an operation procedure for users to perform operation is also displayed. The information input via the displayed keys is output to the control device 160. The maintenance screen is displayed based on the guidance information output from the control device 160.

A specific example of the structure of the control device 160 is described.

Figure 2:
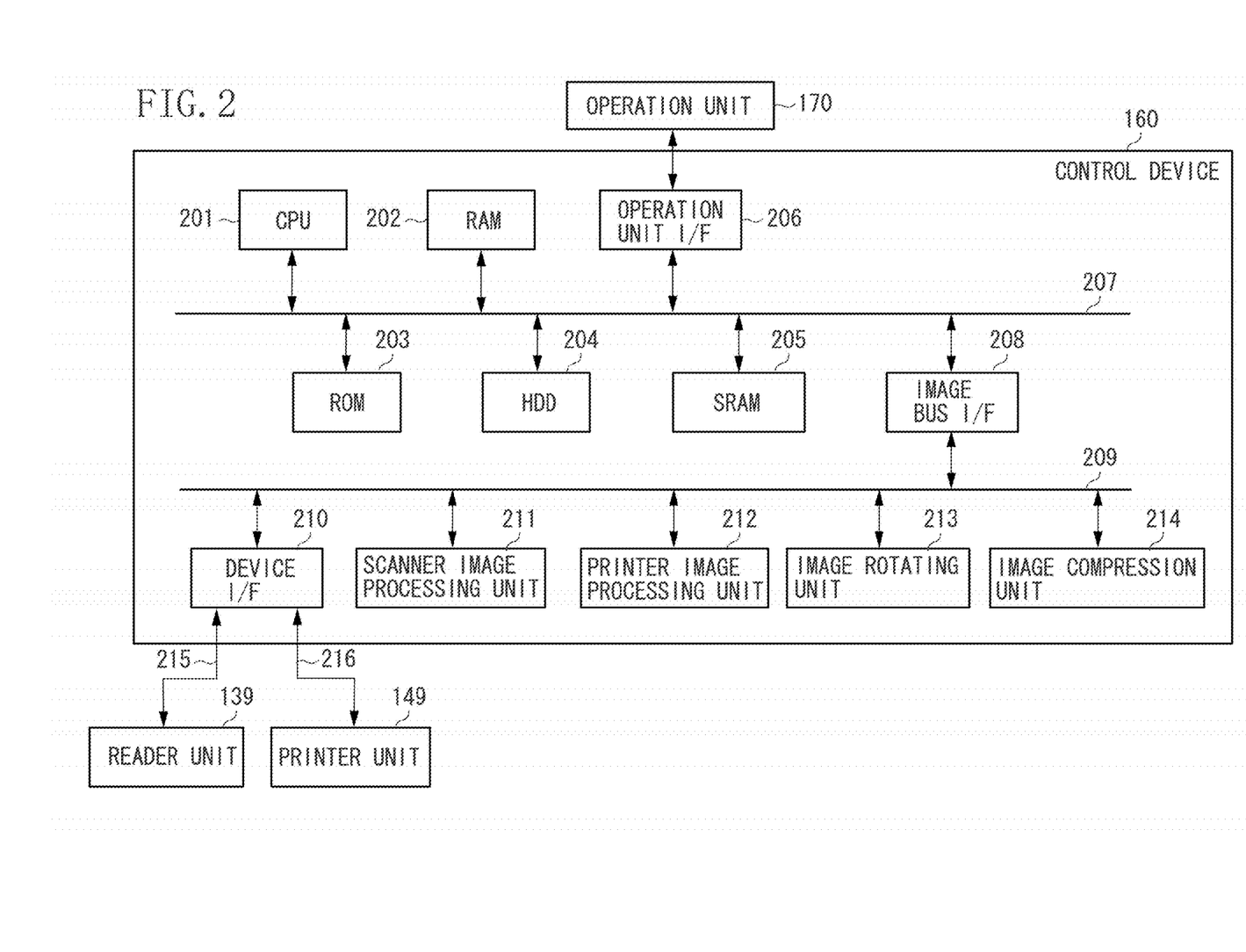
FIG. 2 is a block diagram illustrating an example of a structure of a control device.

FIG. 2 is a block diagram illustrating an example of the structure of the control device 160 according to the present exemplary embodiment. The control device 160 includes a central processing unit (CPU) 201 for performing overall control of the operation of the image forming apparatus. A random access memory (RAM) 202 serves as a work memory for the CPU 201, and also serves as an image memory for temporarily storing image data.

A read-only memory (ROM) 203 is a memory dedicated for reading information stored therein, including a boot ROM, a program ROM, and a data ROM. The boot ROM stores a boot program. The program ROM stores a control program necessary for the CPU 201 to implement predetermined functions. The data ROM is a nonvolatile memory into which information can be electrically written and the stored contents can be erased. For example, an electrically erasable and programmable read-only memory (EEPROM) can be used as the data ROM. The data ROM stores data such as parameters necessary for the CPU 201 to implement predetermined functions.

A hard disk drive (HDD) 204 updatably stores information such as various kinds of software containing a program for guidance, image data, and guidance information. The guidance information includes, for example, information indicating operation contents or procedures for fixing a failure when the failure such as a paper jam has occurred, and operations necessary to resume the job being stopped due to the occurrence of the failure. The guidance information is visualized using messages or images, or combinations of the messages and images.

The guidance information is prepared for each failure occurrence area. In other words, the guidance information is associated with the arranged positions of the sensor groups 150 and 180, and stored. Consequently, the contents of the guidance information differ depending on the failure occurrence areas even though the types of the failure are the same (paper jam). For example, the paper jam detected by the sensor group 150 is considered to have occurred on the conveyance path in the printer unit 149. The printer unit 149 includes conveyance paths such as a sheet feeding system, an image forming system, a fixing system, and a discharge system, and the number of the conveyance paths is larger than that in the reader unit 139. Consequently, in general, the number of the operation procedures to be performed to fix a paper jam in the printer unit 149 is larger than that in the reader unit 139. Further, when a paper jam occurs in the printer unit 149, for the user who has already experienced the complicated operation procedures, the detailed guidance would rather be irritating. The same can be said for the guidance to a paper jam occurred in the reader unit 139.

Therefore, in the present exemplary embodiment, two patterns of the operation procedures for fixing a failure are provided in such a manner that when a failure of the same type is to be fixed, depending on the failure occurrence area, the operation procedures are to be visualized in different expressions. More specifically, one of the two patterns of a first pattern and a second pattern can be selected. The first pattern is for expressing the operation procedures using a plurality of maintenance screens switched for each procedure, and a second pattern is for expressing the operation procedures using a single maintenance screen or maintenance screens of the number smaller than the number of the maintenance screens in the first pattern. The first pattern and the second pattern may be based on the same guidance information. In such a case, the second pattern is a simple pattern in which a part of the maintenance screens included in the first pattern is omitted.

The first pattern and the second pattern use the first and the last maintenance screens in common.

It is not always necessary to use the two patterns with respect to all kinds of failures. The selection of a pattern can be performed only for operation contents or procedures for fixing a failure at a predetermined specific area.

In the present exemplary embodiment, the reader unit 139 is set as the specific area.

A static random access memory (SRAM) 205 is a volatile memory for temporarily storing image data and the other kinds of data. An operation unit interface (I/F) 206 is an interface for sending and receiving various kinds of information to and from the operation unit 170.

The above-described devices are interconnected by a system bus 207. To the system bus 207, an image bus I/F 208 that is an interface with an image bus 209 described below is also connected.

To the image bus 209, a device I/F 210, a scanner image processing unit 211, a printer image processing unit 212, an image rotating unit 213, and an image compression unit 214 are connected. The device I/F 210 is connected to the reader unit 139 and the printer unit 149 illustrated in FIG. 1, and sends and receives image data among these devices. In the image data transmission, the data is converted in a synchronous system or an asynchronous system.

The scanner image processing unit 211 performs, on the image data, in response to an instruction from the CPU 201, image processing such as noise removing processing, moving processing, masking/trimming processing, enlargement/reduction processing, and gradation conversion processing. The printer image processing unit 212 performs, on the image data, image processing such as correction processing and resolution conversion processing. The image rotating unit 213 performs rotation processing on specified image data. The image compression unit 214 performs processing such as JPEG processing for compressing or decompressing multi-valued image data. On binary image data, the image compression unit 214 performs compression/decompression processing such as Joint Bi-level Image Experts Group (JBIG) processing, Modified Modified READ (MMR) processing, a Modified READ (MR) processing, a Modified Huffman (MH) processing, and the like.

The operation of the above-mentioned devices and functional components connected to the image bus 209 is also controlled by the CPU 201 connected via the image bus I/F 208.

The CPU 201 reads a scanner image from the reader unit 139 connected via a reader unit interface 215, and outputs a printer image to the printer unit 149 connected via a printer unit interface 216. The image data subjected to image-processing in the scanner image processing unit 211 is the scanner image, and the image data subjected to image-processing in the printer image processing unit 212 is the image data to be the printer image.

<Operation of Image Forming Apparatus (Operation Supporting Method)>

Operation to be performed in the image forming apparatus 100 having the above-described structure is described. In this description, an example for implementing the guidance function for providing guidance on the operation contents for fixing a paper jam when the paper jam that is an example of failures relating to the image formation has occurred is described. In the guidance function, the control device 160 displays maintenance screens for supporting fixing on the operation panel (display screen) of the operation unit 170. The guidance function is implemented by the CPU 201 in the control device 160 by executing a control program stored in the ROM 203 and a program for guidance stored in the HDD 204.

It is assumed that a paper jam has occurred in an area (the above-described specific area) where the sensor group 180 of the reader unit 139 has been arranged. Based on a detection result from the sensor group 180, the control device 160 detects occurrence of the paper jam in the reader unit 139 (i.e., the specific area). In response to the detection thereof, display of a maintenance screen of the second pattern as an initial screen from the first pattern and the second pattern. The initial screen is called, for convenience, "simple maintenance screen".

<Display Screen>

Figure 3A:
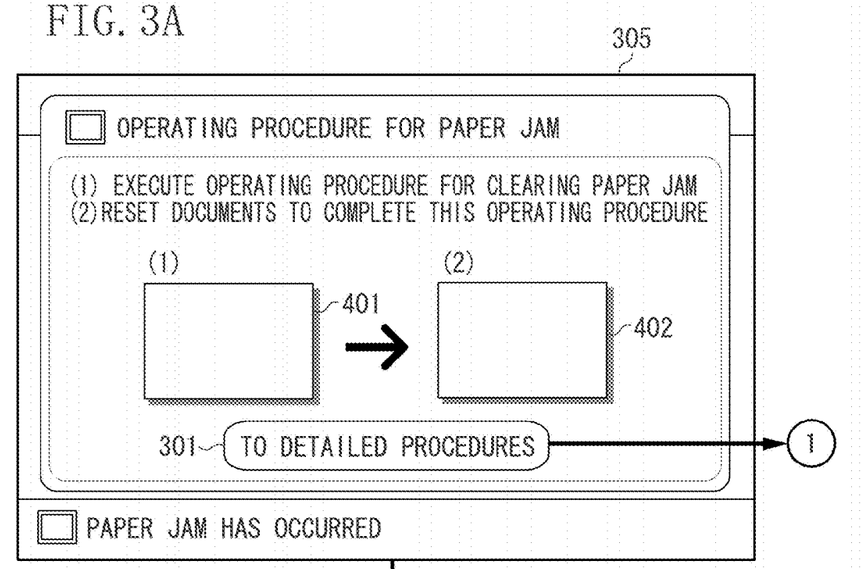
FIGS. 3A to 3F schematically illustrate an example of transition of screens to be displayed on an operation unit.
Figure 3B:
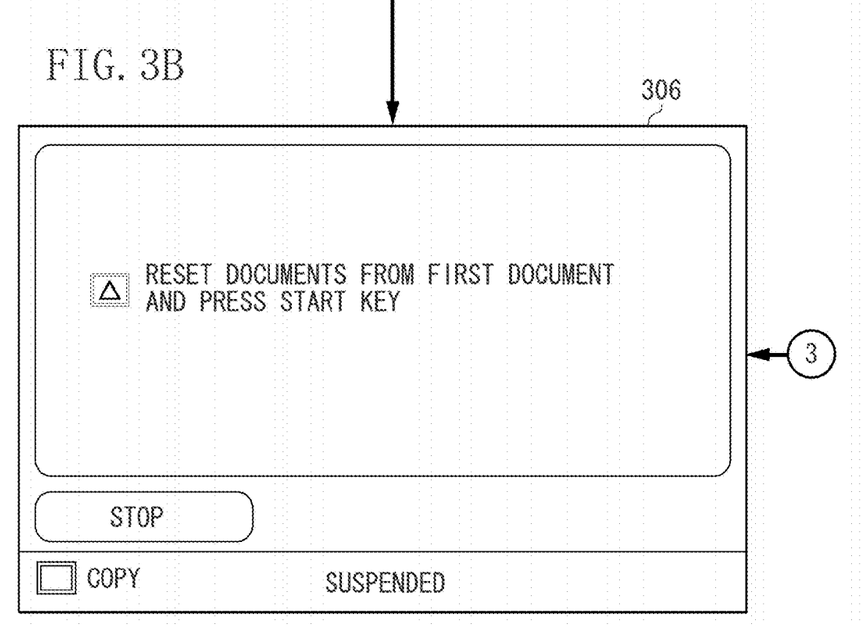

FIG. 3A illustrates an example of the simple maintenance screen. On a simple maintenance screen 305, the jam is expressed as "paper jam", and the occurrence of the paper jam, a message indicating a summary of operation for fixing the paper jam, and an operation image (1) of the message are displayed. Further, a message indicating that the document is to be set to resume the job being stopped due to the paper jam, and an operation image (2) of the message are displayed. After the user performs the paper jam fixing processing, and resets the document, the simple maintenance screen 305 is immediately switched to a reread standby screen 306 illustrated in FIG. 3B. This provides the user with effective guidance of the operation procedures for fixing the paper jam without causing stress to user.

Figure 3C:
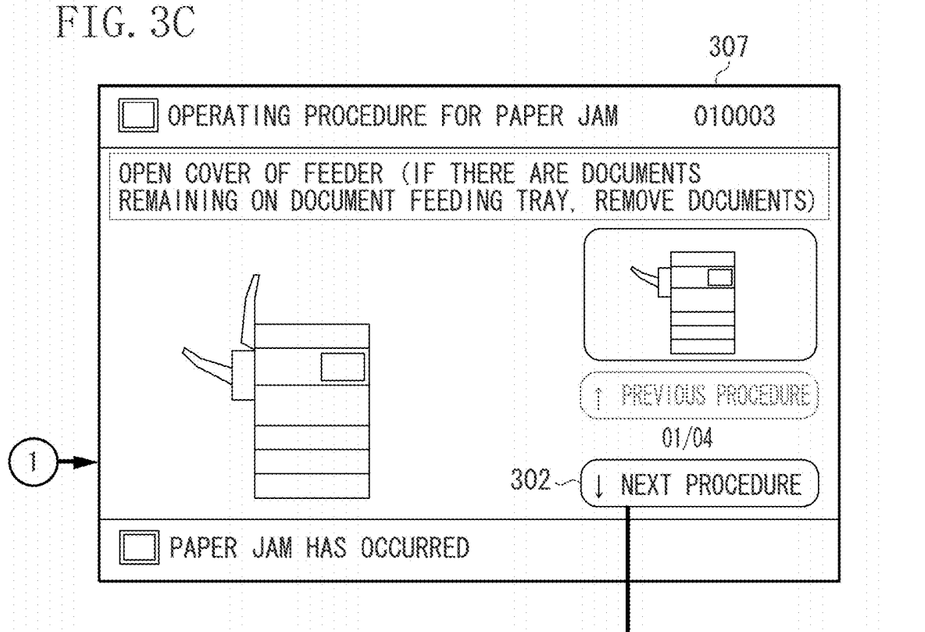

Meanwhile, if a "TO DETAILED PROCEDURES" key 301 is pressed by the user, the screen on the operating unit 170 is switched to a maintenance screen visualized by the first pattern as illustrated in FIG. 3C. The maintenance screen by the first pattern is called, for convenience, "detailed maintenance screen".

Figure 3D:
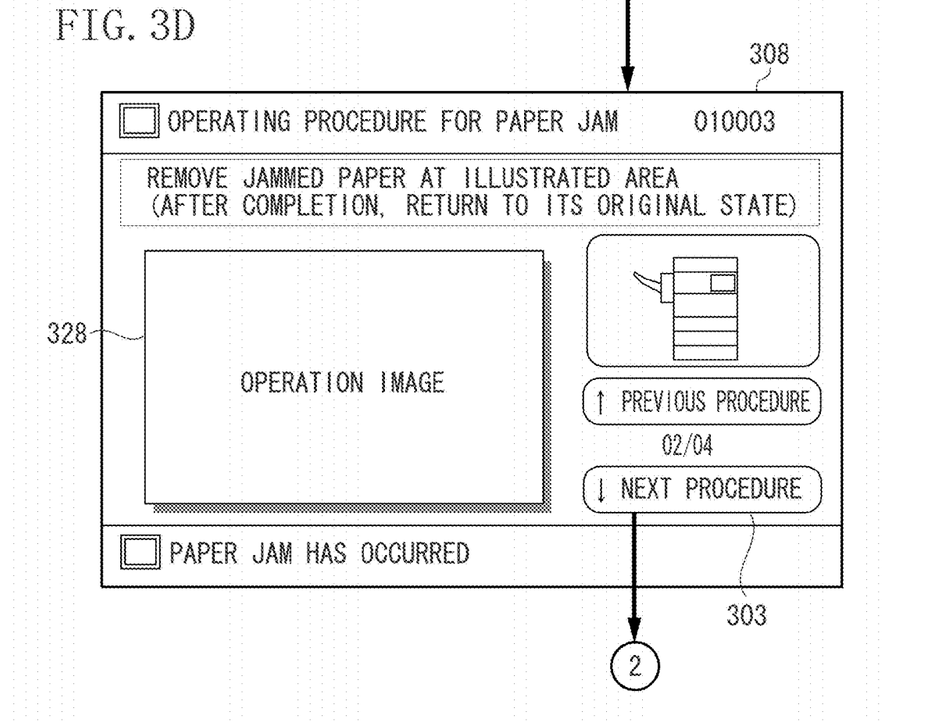

A detailed maintenance screen 307 illustrated in FIG. 3C is, in all screens of the first pattern, the maintenance screen of the second page. On the detailed maintenance screen 307, a message prompting the user to open the cover of the document conveying unit 136 and an operation image of the message are displayed. This enables the user to readily understand where to start the operation. On the detailed maintenance screen 307, when a "NEXT PROCEDURE" key 302 is pressed, the screen is switched to a detailed maintenance screen 308 of the third page illustrated in FIG. 3D.

Figure 3E:
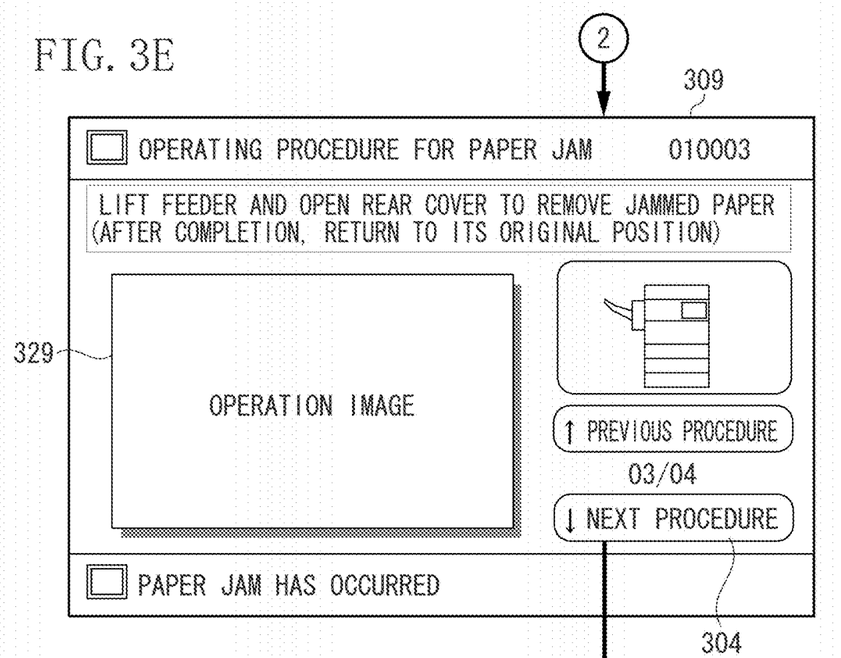
Figure 3F:
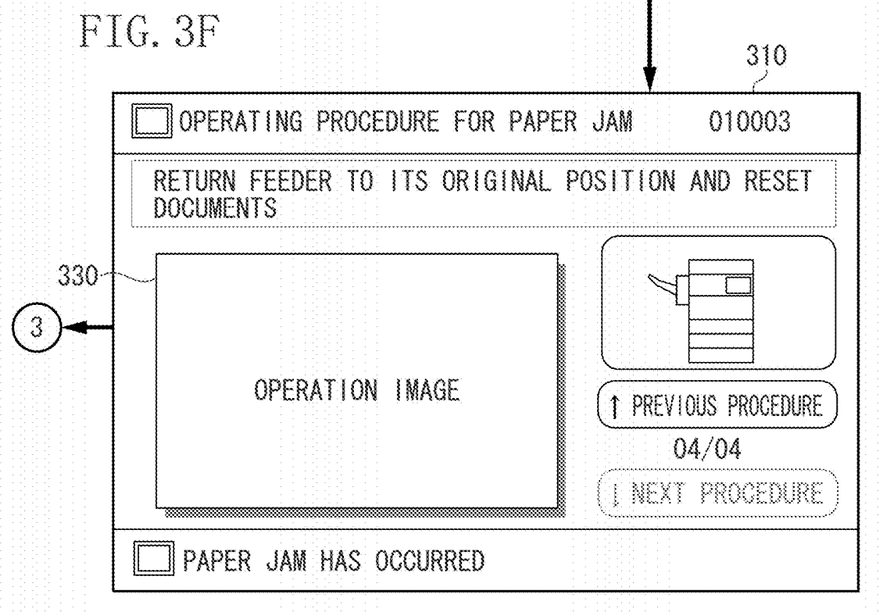

On the detailed maintenance screen 308, a message urging the user to remove the recording paper in the document conveying unit 136 and an operation image 328 of the message are displayed. On the detailed maintenance screen 308, when a "NEXT PROCEDURE" key 303 is pressed, the screen is switched to a detailed maintenance screen 309 of the fourth page illustrated in FIG. 3E. On the detailed maintenance screen 309, a message prompting the user to remove the recording paper remaining in the rear cover of the document conveying unit 136 and an operation image 329 of the message are displayed. On the detailed maintenance screen 309, when a "NEXT PROCEDURE" key 304 is pressed, the screen is switched to a detailed maintenance screen 310 of the fifth page illustrated in FIG. 3F. On the detailed maintenance screen 310, a message indicating that after the cover of the document conveying unit 136 is closed, the document is to be set and an operation image 330 of the message are displayed. After the display of the detailed maintenance screen 310, when all of the operations instructed so far have been completed, and the document is set on the document conveying unit 136, the display screen is switched to the reread standby screen 306 illustrated in FIG. 3B. In other words, the state becomes similar to the state where the document is set while the simple maintenance screen 305 illustrated in FIG. 3A is being displayed.

<Display Control Procedure>

Figures 4, 4A:
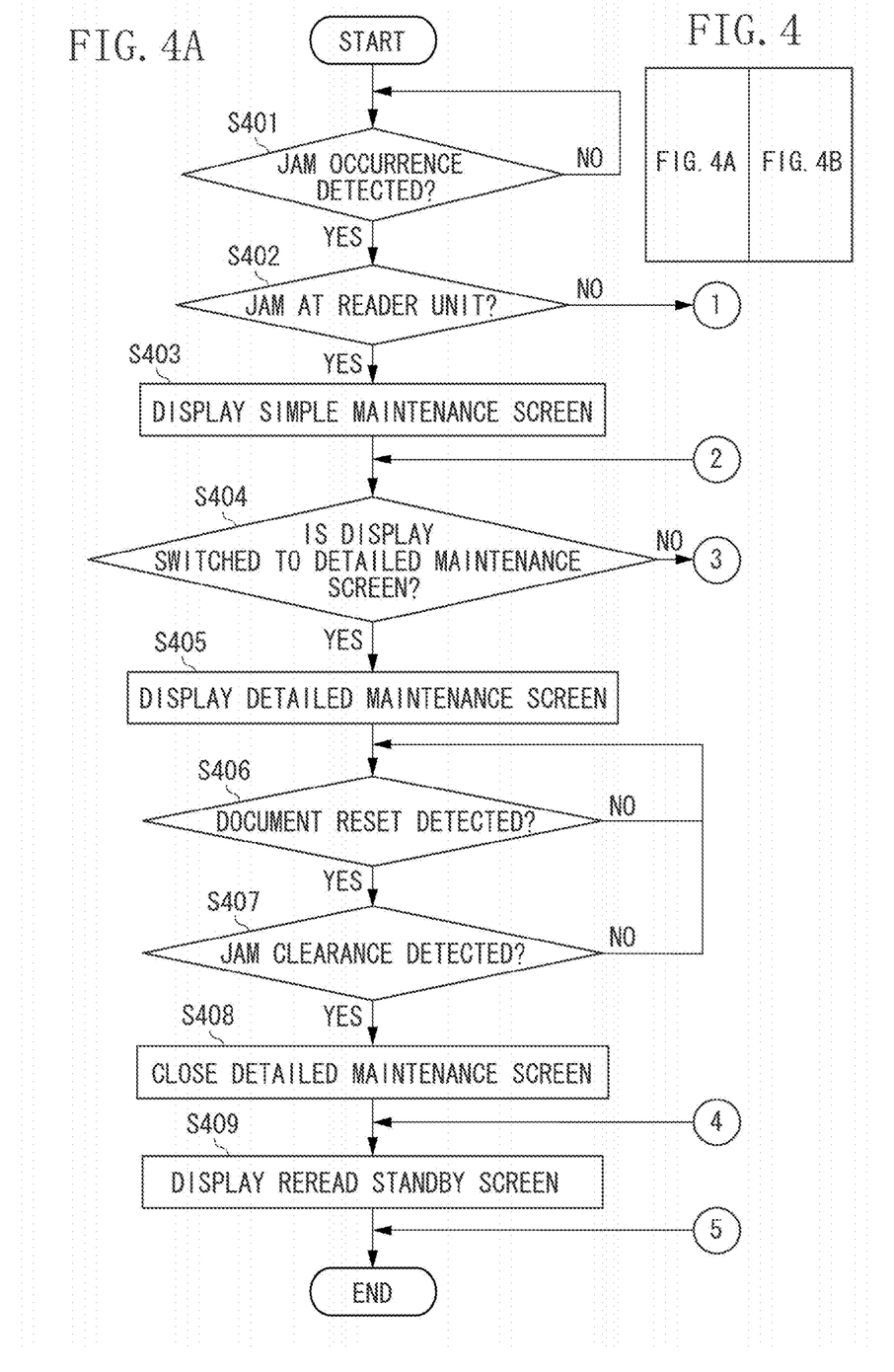
FIGS. 4A and 4B illustrate a processing procedure according to the exemplary embodiment.
Figure 4B:
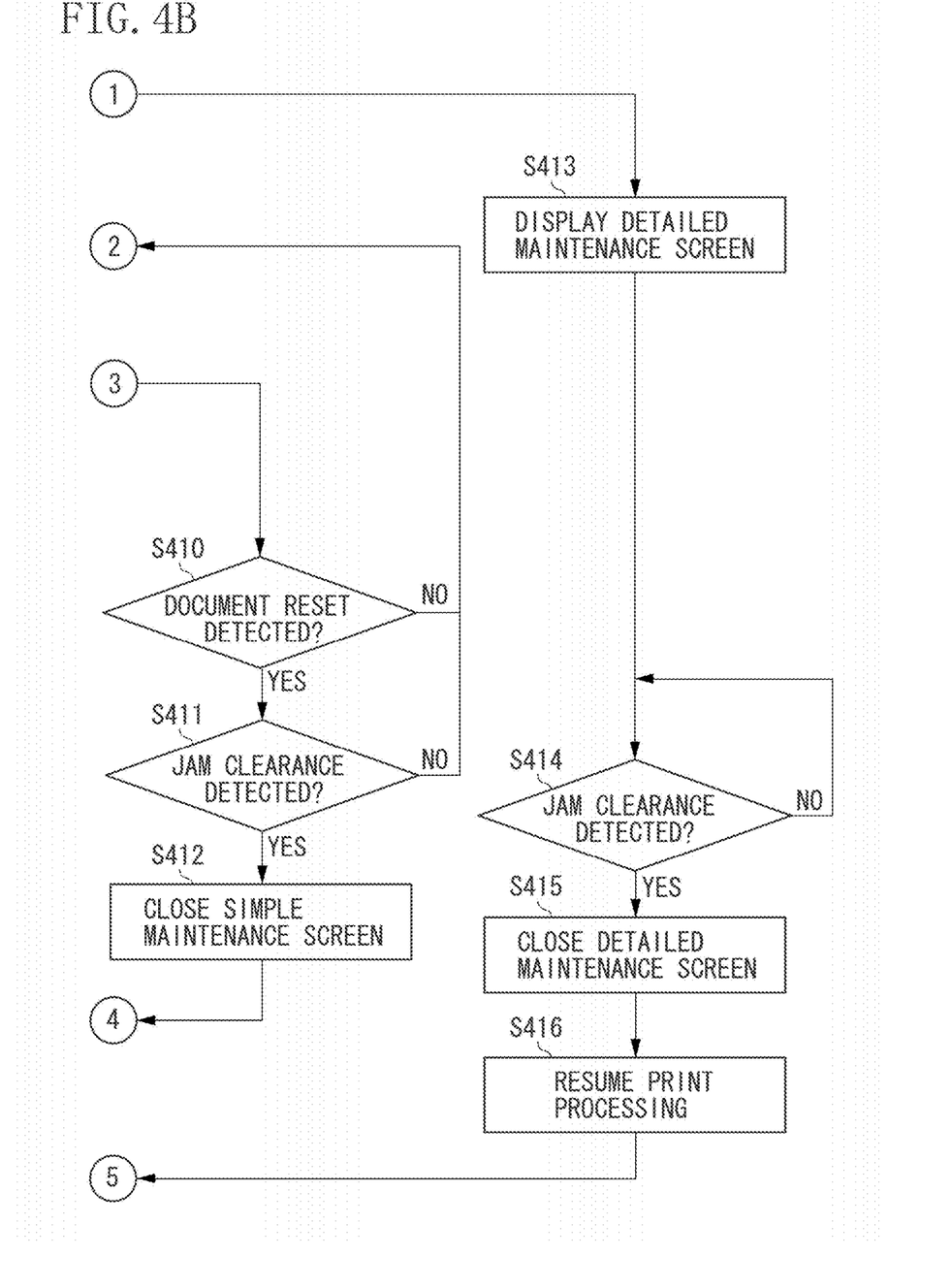

With reference to FIGS. 4A and 4B, an example of the display control procedure performed by the control device 160 to enable the screen display illustrated in FIGS. 3A to 3F is described.

The display control illustrated in FIGS. 4A and 4B is started when the control device 160 receives a request for executing copying for printing an image of the document read by the reader unit 139 with the printer unit 149. In another case, the display control is started when the control device 160 receives a print execution request for printing an image received from an external information processing apparatus with the printer unit 149.

In step S401, during execution of the copying operation or printing operation, the control device 160 determines whether occurrence of a paper jam has been detected by the sensor group 180 of the reader unit 139 or by the sensor group 150 of the printer unit 149. In a case where occurrence of a paper jam has been detected (YES in step S401), the control device 160 determines whether the detected jam has occurred in the reader unit 139. If the detected jam has not been occurred in the reader unit 139 (NO in step S402), the control device 160 determines that the jam has occurred in the printer unit 149, and then, the processing proceeds to step S413.

In step S402, in a case where the control device 160 determines that a paper jam has occurred in the reader unit 139 (YES in step S402), in step S403, the control device 160 displays the simple maintenance screen 305 illustrated in FIG. 3A. In step S404, the control device 160 determines whether an instruction for switching the display to the detailed maintenance screen 307 has been issued on the simple maintenance screen 305. The instruction for switching the display is sent to the control device 160 when the "TO DETAILED PROCEDURES" key 301 is pressed on the simple maintenance screen 305 in FIG. 3A.

In a case where the instruction for switching the display has been issued (YES in step S404), in step S405, the control device 160 displays the detailed maintenance screen 307 in FIG. 3C. Then, as described above, when the user presses the "NEXT PROCEDURE" key 302, or the like, the detailed maintenance screen 307 sequentially changes to the detailed maintenance screens 307, 308, 309, and 310 of the next procedures. Then, in step S406, the control device 160 waits for the document to be reset.

In a case where the document has been reset (YES in step S406), in step S407, the control device 160 waits for a result of jam fixing detection. The detection result is to be received from the sensor group 180 in the reader unit 139. In a case where the control device 160 receives the jam fixing detection result (YES in step S407), in step S408, the control device 160 closes the detailed maintenance screen 310. Then, in step S409, the control device 160 displays the reread standby screen 306 illustrated in FIG. 3B on the operation unit 170, and ends the control for the display of the guidance.

In step S404, in a case where the instruction for switching the display to the detailed maintenance screen 307 has not been issued (NO in step S404), the control device 160 waits until the document is reset (NO in step S410). In a case where the document has been reset (YES in step S410), in step S411, the control device 160 waits for a result of jam fixing detection. Until the detection result is received, the processing after step S404 is repeated (NO in step S411). In a case where the detection result is received (YES in step S411), in step S412, the control device 160 closes the simple maintenance screen 305. In step S409, the control device 160 displays the reread standby screen 306 illustrated in FIG. 3B on the operation unit 170, and ends the control for the display of the guidance.

In step S413, a maintenance screen for fixing the jam occurred in the printer unit 149 is displayed. The maintenance screen is a detailed maintenance screen different from the screens illustrated in FIGS. 3A to 3F. In step S414, the control device 160 waits until a jam fixing detection is received from the sensor group 150 in the printer unit 149 (NO in step S414). In a case where the control device 160 receives a jam fixing detection (YES in step S414), in step S415, the control device 160 closes the maintenance screen. Then, the control device 160 resumes the print processing in the printer unit 149, and ends the control for the display of the guidance.

The above-described display control enables the user, with respect to the jam occurred in the reader unit 139, to check the jam fixing procedures by checking only the simple maintenance screen 305. As a result, it is not necessary to check the detailed maintenance screens to the last screen, and the user can be free from stress. On the other hand, users who prefer the guidance with the detailed maintenance screens can press the "TO DETAILED PROCEDURES" key 301 to be input to the simple maintenance screen 305. In such a case, the operation from the procedure of opening and closing the cover, through the procedure of removing recording paper on a conveyance path, to the procedure of resetting the document can be checked. As described above, for the users not familiar with the jam fixing procedures, this guidance function is very convenient.

In the present exemplary embodiment, on the simple maintenance screen 305 that is the initial screen, the contents of the operation to cause the resumption of the job being stopped due to the occurrence of the jam by the fixing of the jam is displayed. More specifically, the setting operation of the document on the document conveying unit 136 in the reader unit 139 enables the user to understand the operation to be performed to resume the job being stopped by the occurrence of the jam. Consequently, for a user not capable of knowing the fixing procedures until checking the plurality of operation procedures to the last procedure, the function can be very useful since the user can know the fixing procedures when the user see the summary of the operation displayed on the simple maintenance screen 305.

The method to know the operations to be performed to resume the job is not limited to the example according to the present exemplary embodiment. For example, a screen enabling users to know the above-described operations can be displayed by receiving an input for closing the simple maintenance screen 305 or the detailed maintenance screens 307 to 310 via the operation unit 170.

Further, in the present exemplary embodiment, the first and the last maintenance screens of the first pattern and the second pattern are used in common, however, it is not always necessary to use the screens. For example, as the maintenance screen according to the first pattern, the detailed maintenance screen 307 illustrated in FIG. 3C can be used as the first maintenance screen. Alternatively, the simple maintenance screen 305 can be a single screen, or include a plurality of maintenance screens (however, the number of the maintenance screens is smaller than the number of the detailed maintenance screens in the first pattern).

Further, in the present exemplary embodiment, as an example of the failure, a paper jam occurred on a conveyance path has been described. Alternatively, as long as the failure relates to image formation, the failure is not limited to the paper jam. For example, the failure can be a failure relating to replacement of consumables such as print recording papers and toners.

In the present exemplary embodiment, the predetermined specific area is the conveyance path in the reader unit 139. Alternatively, as long as the guidance on the operation procedures for fixing a failure can be simplified, the area is not limited to the area in the example according to the present exemplary embodiment, but any area can be employed.

In the present exemplary embodiment, the storage media for storing the computer program to be executed by the CPU 201 to implement the guidance function are the ROM 203 and the HDD 204 in the control device 160, however, the storage media are not limited thereto. For example, the CPU 201 can read the computer program from a digital versatile disk (DVD), a universal serial bus (USB) memory, or other computer-readable compact discs.

Alternatively, the computer program can be appropriately downloaded from a server to which the image forming apparatus 100 is accessible. Alternatively, it is not limited to the example in which the CPU 201 executes all processes, but the image forming apparatus 100 can access the above-described server and a part or all of the processing to be performed by the CPU 201 can be executed by a CPU in the server.

According to the present exemplary embodiment, with respect to the operation contents for fixing a failure occurred in a specific area, the two types of maintenance screens of different number of screens can be switched. This provides the effective operation support for the user without causing stress to the users.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171539 filed Aug. 21, 2013, which is hereby incorporated by reference herein in its entirety.

What is claimed is:

1. An image forming apparatus comprising:
   a detection unit configured to detect an occurrence of a failure and the occurrence area of the failure in the image forming apparatus;
   a first display control unit configured to switch maintenance screens to be displayed indicating a plurality of operation procedures necessary to remove the failure;
   a second display control unit configured to display one or more maintenance screens indicating the operation procedures necessary to remove the failure, which include one or more maintenance screens of the number smaller than the number of the screens to be displayed by the first display control unit; and
   a control unit configured to perform control to enable selective execution of the display by the first display control unit and the display by the second display control unit when the area of the occurrence of the failure detected by the detection unit is a specific area, and perform control to execute the display by the first display control unit when the area of the occurrence of the failure detected by the detection unit is not the specific area.

2. The image forming apparatus according to claim 1, further comprising:
   a scanner unit configured to read a document; and
   a printing unit configured to print an image,
   wherein the control unit performs control to enable selective execution of the display by the first display control unit and the display by the second display control unit if a failure is detected in an area relating to the scanner unit, and performs control to execute the display by the first control unit if a failure is detected in an area relating to the printing unit.

3. The image forming apparatus according to claim 2, wherein the failure in the area relating to the scanner unit is a paper jam on a conveyance path for conveying a document to be read, and the failure in the area relating to the printing unit is a paper jam on a conveyance path for conveying a recording sheet to be printed or a recording sheet that has been printed.

4. The image forming apparatus according to claim 1,
   wherein the first display control unit switches procedures to be displayed for removing the occurred failure, and procedures necessary to resume the operation stopped due to the occurrence of the failure as different maintenance screens, and
   wherein the second display control unit displays the procedures for removing the occurred failure, and the procedures necessary to resume the operation stopped due to the occurrence of the failure on one maintenance screen.

5. The image forming apparatus according to claim 1, wherein the control unit performs control to display an initial screen of the maintenance screens to be displayed by the second display control unit, and in a case where an instruction for switching to the display by the first display control unit is detected on the initial screen, performs control to switch to the display by the first display control unit.

6. A method for controlling an image forming apparatus, comprising:
   detecting an occurrence of a failure and the occurrence area of the failure in the image forming apparatus;
   performing a first display control for switching maintenance screens to be displayed indicating a plurality of operation procedures necessary to remove the failure;
   performing a second display control for displaying one or more maintenance screens indicating the operation procedures necessary to remove the failure, which include one or more maintenance screens of the number smaller than the number of the screens to be displayed in the first display control and
   performing control to enable selective execution of the display by the first display control and the display by the second display control when the area of the occurrence of the failure detected is a specific area, and performing control to execute the display by the first display control when the area of the occurrence of the failure detected is not the specific area.

7. A non-transitory computer-readable storage medium storing a computer program for causing a computer to execute a control method for controlling an image forming apparatus, comprising:

detecting an occurrence of a failure and the occurrence area of the failure in the image forming apparatus;

performing a first display control for switching maintenance screens to be displayed indicating a plurality of operation procedures necessary to remove the failure;

performing a second display control for displaying one or more maintenance screens indicating the operation procedures necessary to remove the failure, which include one or more maintenance screens of the number smaller than the number of the screens to be displayed in the first display control and     performing control to enable selective execution of the display by the first display control and the display by the second display control when the area of the occurrence of the failure detected is a specific area, and performing control to execute the display by the first display control when the area of the occurrence of the failure detected is not the specific area.

\* \* \* \* \*